US006355988B1

(12) United States Patent
Maple

(10) Patent No.: US 6,355,988 B1
(45) Date of Patent: Mar. 12, 2002

(54) WATER LIFT GENERATOR SYSTEM

(76) Inventor: Eugene R. Maple, 107 N. Stout St., Harrisville, WV (US) 26362

( * ) Notice: Subject to any disclaimer, the term of this patent is extended or adjusted under 35 U.S.C. 154(b) by 0 days.

(21) Appl. No.: 09/707,849

(22) Filed: Nov. 8, 2000

(51) Int. Cl.[7] .......................... H02P 9/04; F04B 19/16; F01D 25/28; F03C 5/00; G09F 19/00

(52) U.S. Cl. .............................. 290/54; 415/5; 415/7; 60/496; 40/406

(58) Field of Search .............................. 290/54; 415/5, 415/7; 60/496; 40/406

(56) References Cited

U.S. PATENT DOCUMENTS

| | | | | |
|---|---|---|---|---|
| 3,194,008 A | | 7/1965 | Baumgartner | 60/22 |
| 3,697,765 A | * | 10/1972 | Carini | 290/54 |
| 3,934,964 A | | 1/1976 | Diamond | 415/7 |
| 4,157,014 A | * | 6/1979 | Clark, Jr. | 60/665 |
| 4,170,114 A | * | 10/1979 | Pruett | 60/496 |
| 4,242,868 A | | 1/1981 | Smith | 60/496 |
| 4,392,062 A | * | 7/1983 | Berving | 290/54 |
| 4,471,613 A | * | 9/1984 | Lang | 60/496 |
| 4,508,971 A | * | 4/1985 | Bailey | 290/1 R |
| 4,698,516 A | | 10/1987 | Thompson | 290/54 |
| 4,873,450 A | * | 10/1989 | Quaintance | 290/52 |
| 5,426,877 A | | 6/1995 | Lin | 40/406 |
| 5,944,480 A | | 8/1999 | Forrest | 415/5 |
| 6,176,027 B1 | * | 1/2001 | Blount | 40/406 |

* cited by examiner

*Primary Examiner*—Karl Tamai
*Assistant Examiner*—Pedro F. Cuevas
(74) *Attorney, Agent, or Firm*—Robert N. Blackmon

(57) ABSTRACT

A water lift generator system for generating electricity by a water system propelled by the force of water cycling through the system. A multi-chamber water lift system includes an down cycle converting the potential energy of water traveling downward through a down tube and out a nozzle or spout turned tangential to the main chamber to cause the chamber to rotate. The rotation of the system runs an up—cycle having several tee shaped tubes which operate to lift water from one chamber to the next higher chamber. The topmost chamber has an additional tee tube connecting the inner chamber with the down tube to complete the cycle. A water supply may be provided at the base of the machine to provide a closed cycle.

7 Claims, 7 Drawing Sheets

WATER LIFT GENERATOR SYSTEM

BACKGROUND OF THE INVENTION

1. FIELD OF THE INVENTION

The present invention relates to a water lift system for generating power while providing a novel water flow device.

2. DESCRIPTION OF THE PRIOR ART

The use of water to generate power is well known and is employed in diverse operations from hydroelectric dams to small village grinding mills powered by local streams. The power of rushing current represents an immense potential power source still relatively unutilized today. One viewing the destruction caused by overflowing rivers in a flood zone will recognize the power and force in even a moderate stream of water. Tapping even a small portion of the potential energy of a stream through the use of a water wheel or other device could severely impact the amount of electricity which traditional power plants would need to generate, saving the limited fossil fuel supply for our future generations.

Through the use of high tech materials, low tolerance bearings, and advances in designs, modern generators can be designed to take advantage of even small flows to generate power. And through efficient application of water flows through a device, energy efficient water lift cycles can be used to either generate electricity or provide novel closed water cycle systems requiring little or no power to use.

None of the above inventions and patents, taken either singly or in combination, is seen to describe the instant invention as claimed.

SUMMARY OF THE INVENTION

Accordingly, it is a principal object of the invention to provide a novel and unique water lift system that uses a continuous water cycle which will be self-powering and will generate power.

It is another object of the invention to provide a water lift system which in which the entire flow system is visible for entertainment and education.

It is a further object of the invention to provide a water lift system having a main cylindrical body and a plurality of down spouts which provide motivating force to cause the water lift system to revolve about its axis.

Still another object of the invention is to provide a water lift system having a plurality of chambers within the main body each having a tee jets within each chamber situated to draw fluids from the next lower chamber.

It is yet another object of the invention to provide low friction bearings on the main body to allow the body to rotate, and a braking system to prevent the body from rotating.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

Figure 1:
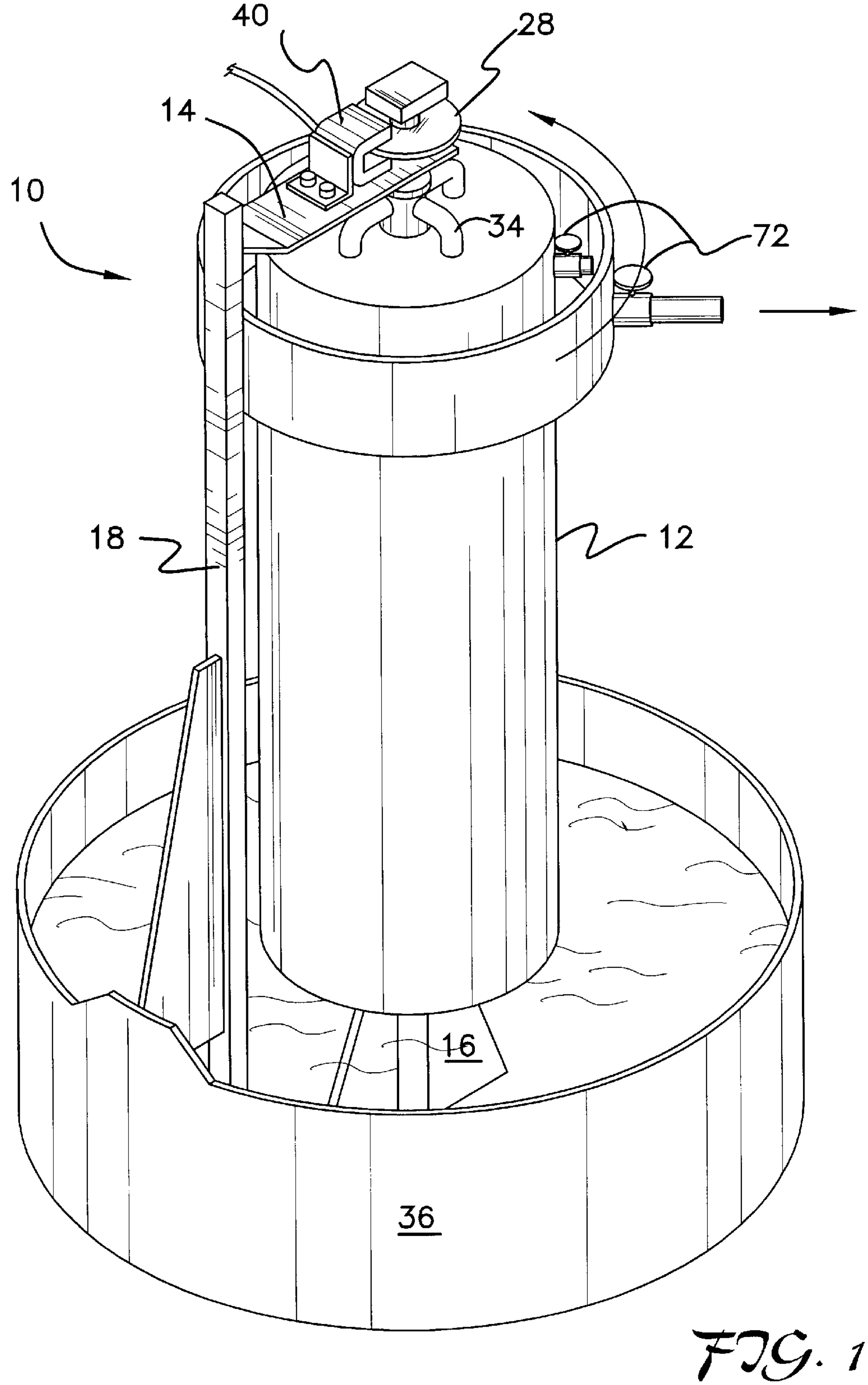
FIG. 1 is environmental perspective view of a water lift generator system according a first embodiment of the present invention.
Figure 2:
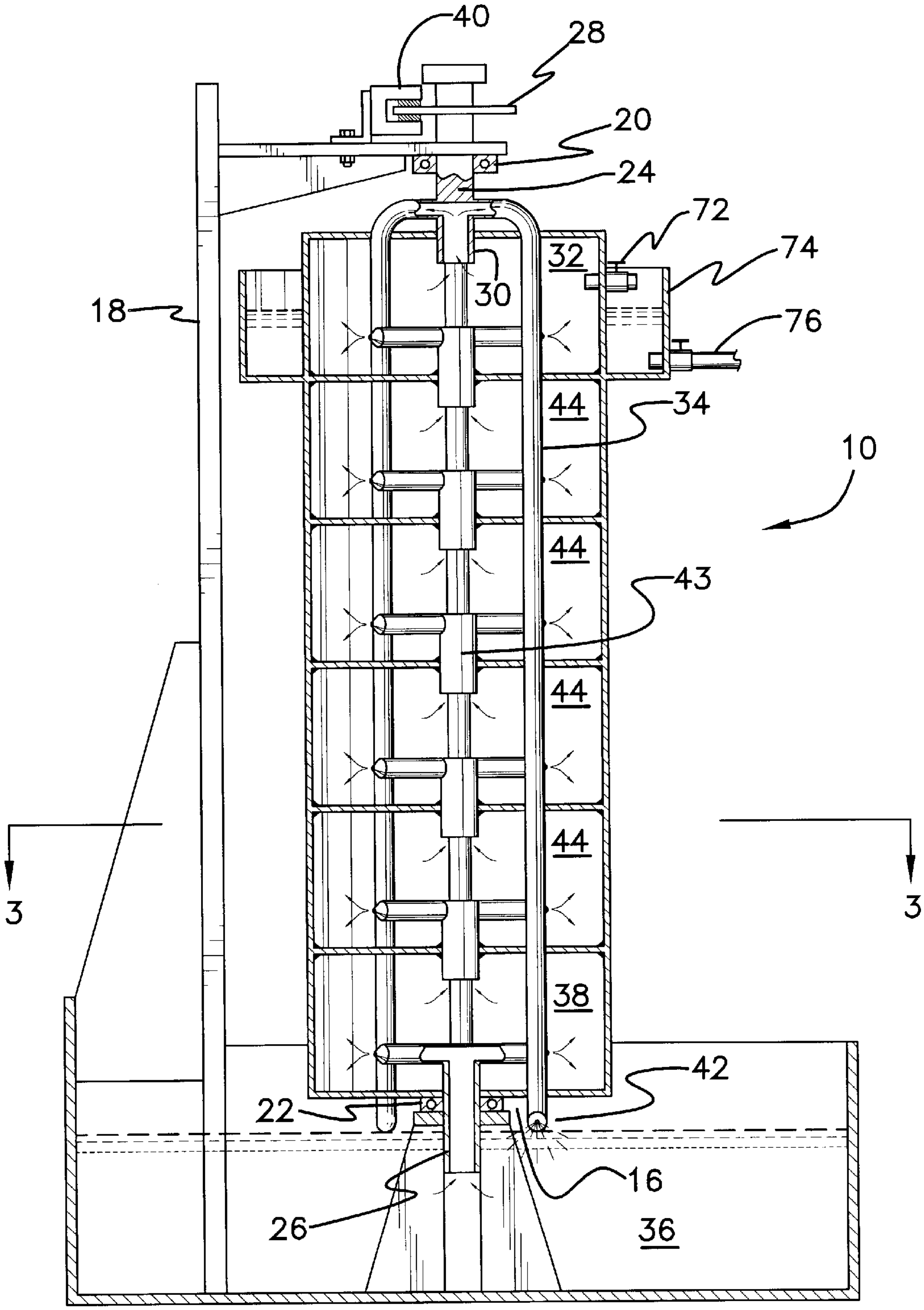
FIG. 2 is a side elevational, breakaway view of the water lift generator system according a first embodiment of the present invention.
Figure 3:
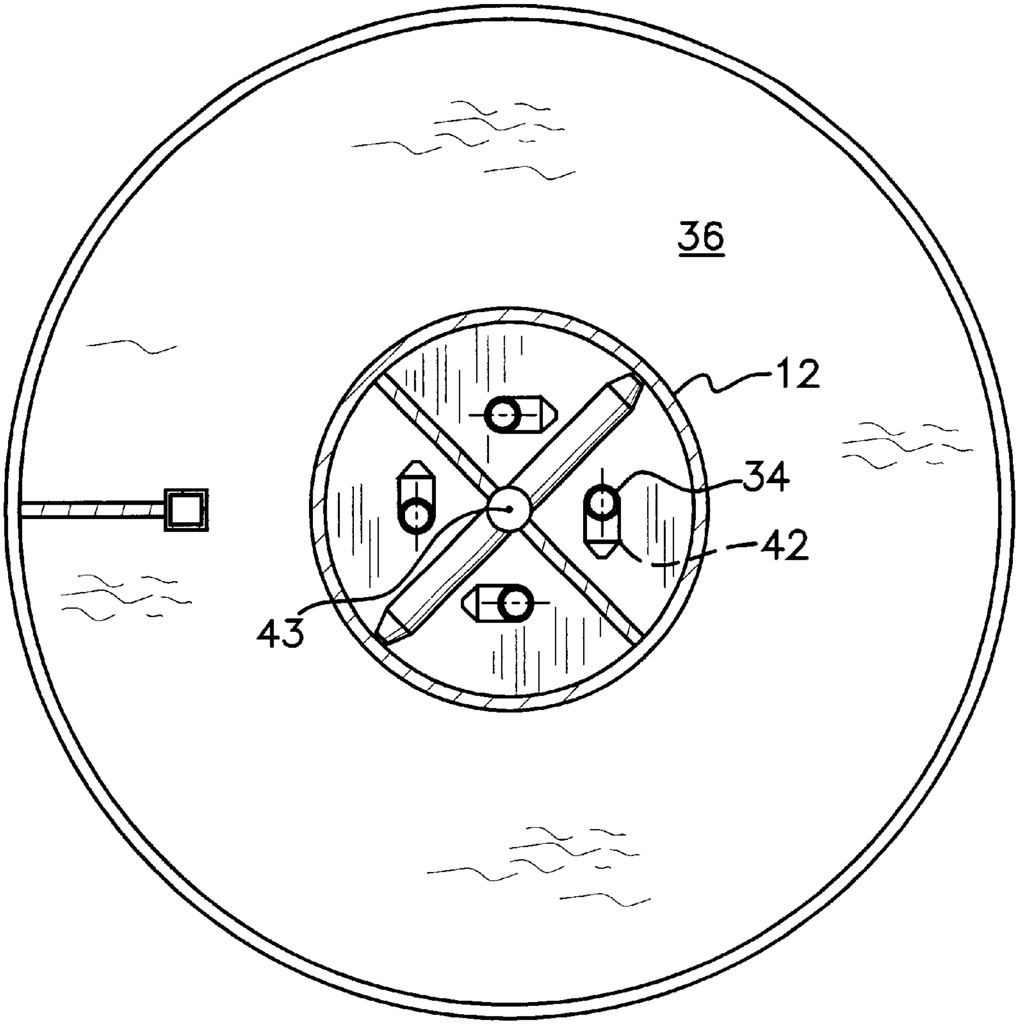
FIG. 3 is a cross-sectional view taken along line 3—3 of FIG. 2 of the water lift generator system according to a first embodiment of the present invention.

The present invention relates to a novel system for generating electricity and for providing an entertaining water cascade novelty water recirculation system. With reference made to FIGS. 1–3, the novel water system 10 utilizing the potential energy of water running through the system will be explained.

The water recirculation system 10 has a main cylindrical body 12 located between a top and bottom support flange 14, 16. The flanges are affixed to a wall or other support structure 18 to maintain the flanges in a fixed position and preferably in a fixed horizontal position. Connected to the top and bottom flanges 14, 16, respectively, are bearings 20, 22 aligned with an opening in the support flanges 14, 16 to rotatably receive a pair of water tubes 24, 26 therethrough. The top tube 24 extends from through the bearing to a top cylindrical section having a flange ring 28 extending radially therefrom. The bottom portion of the tube is attached to a water flow tee 30 which directs water from a top most chamber 32 of the cylindrical housing 12 to one of the multiple down tubes 34. Four down tubes 34 are shown in the drawings as an example only. Any number of tubes can be used depending on the flow rate of water through the system, with six down tubes being preferred.

The bottom of the water flow tee 30 is non-rotatably attached to the cylindrical body 12 to support the top of the housing 12. The bottom of the cylindrical housing 12 is non-rotatably attached to a bottom water tube 26, which is a water tee drawing water from a base water supply 36 into the lowermost chamber 38.

The cylindrical housing 12 is thus attached to the top and bottom water tubes 24, 26 which are in turn rotatably supported in their respective bearings 20, 22 so that the cylindrical housing can rotate freely between the support flanges 14, 16 with little or no friction.

The rotation of the device is controlled by a magnetic control system 40 which acts as both a generator and a governor. The flange ring 28 has magnets arranged about its periphery to cooperate with the control system 40 to cause a variable magnetic field across the control system 40 to generate electricity as the cylindrical body 12 and attached top tube 24 rotates. In order to stop the cylindrical body, a suitable magnetic field can be applied across the control system 40 to create a braking force on the flange 28. Alternatively, a mechanical braking system can be added into the control system 40 or in addition to the control system to provide conventional braking force. The control system 40 likewise can be used as a governor or engine to provide braking force when the system is over a certain speed, or to provide electrical power to rotate the system during start up or when the system is below a certain speed.

In operation, all of the chambers of the cylindrical body are filled with water, including top chamber 32, bottom chamber 38, and the intermediate chambers 44. Each chamber is connected to the next higher chamber by a water tee 43 for lifting water to the next higher chamber during rotation of the cylindrical housing 12. The control system 40 may be used to brake the system as water is added. The brake is then release causing water to flow downwardly through the down tubes 34. The spouts 42 of the down tubes are all angled tangentially outward from the cylindrical body to cause a rotational motivational force as water exits the spouts 42 into the base water supply. As water flows out the spouts 42, more water will be drawn into and through the down tube 34 by a combination of gravity and vacuum pressure caused by the exiting water, increasing the flow rate through the tube. The increased flow rate through the tube will in turn cause the cylindrical housing to increase its rotational speed under the motivational force of water exiting the spouts until some theoretical maximum is reached.

The water tees 26, 30, 43 will rotate in conjunction with the cylindrical housing 12. Each water tee is directed radially outward to facilitate water being ejected from the tube. As the rotational speed of the system passes a minimum rotational velocity, the rotation of the water tees 26, 43, 30 and the vacuum pressure caused by the ejected water will cause sufficient vacuum to draw water from the next lower chamber into the water tee lifting the water into the next higher chamber. In a similar manner, water tee 26 will draw water from the water supply base 36 to provide a continuous supply of water. As the water lifts from one chamber into the next higher chamber, water reaching the uppermost chamber 32 will be drawn next into water tee 30 and outwardly into the down tubes creating a continuous water cycle.

The entire system can be sized according to the flow rates desired, with large chambers, different number of chambers, and different numbers of flow tubes as needed to accommodate the supply. Also, if a running water supply such as a small stream is available, "new" water can be injected into the top of the device and through the down tubes 34 either to convert additional potential energy into electrical power or to provide enough additional force during start up. One skilled in the art would also appreciate that as the size of the system increased, the down tubes 34 could incorporated internal to the cylindrical body to concentrate the system and to decrease the overall resistance on the system.

The system can also be serially connected to other systems. As shown in FIG. 1, a valve 72 provides an additional water outlet from the system. The outlet can be directed into a trough 74 which surrounds, but does not contact the cylindrical housing 12. The trough 74 collects water exiting valve 72 and can be connected by a pipe to a second water lift system (not shown) to create sequential water lift systems for practical work or as part of a novelty system.

Figure 4:
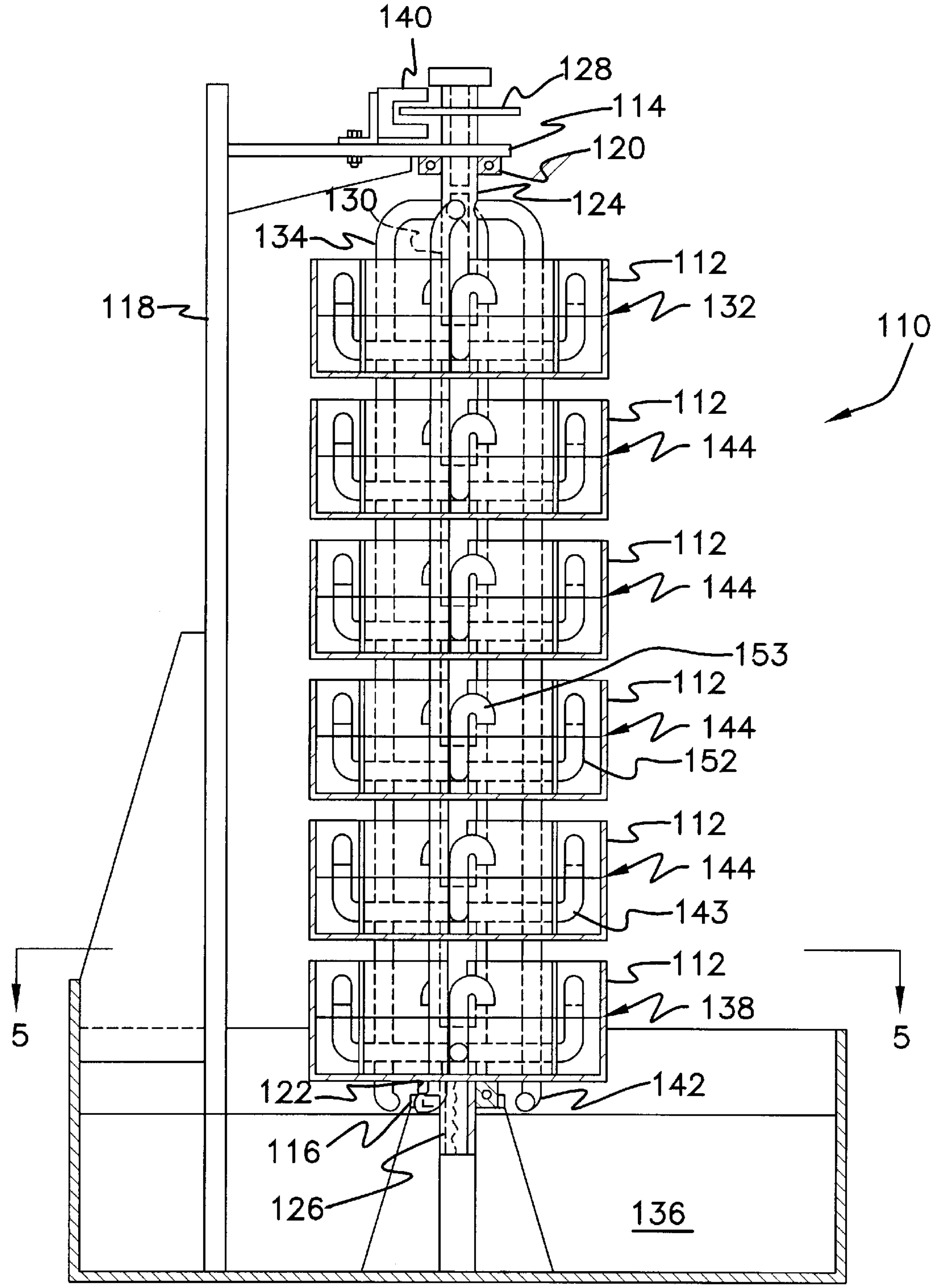
FIG. 4 is a side elevational, breakaway view of the water lift generator system according a second embodiment of the present invention.
Figure 5:
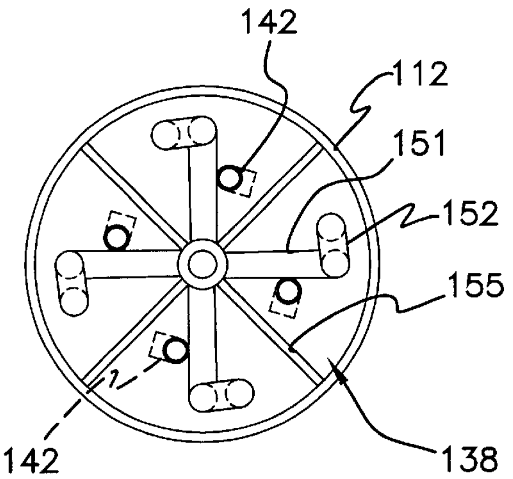
FIG. 5 is a cross-sectional view taken along line 5—5 of FIG. 4 of the water lift generator system according to a second embodiment of the present invention.

The device may be additionally used as a novelty system by making the walls of the cylinder out of Plexiglas, glass, or similar transparent material so that the flow through the water system 10 can be viewed from outside the cylindrical body 12. Dyes can be added to the water to further distinguish the flow paths through the system. Where appropriate the rotation of the cylindrical body 12 during start up or in operation could be assisted by the addition of electric power through the control system 40 or when flow speeds are insufficient to keep the device in constant motion. FIGS. 4–5 shows an alternative embodiment of the inventions. Unless otherwise noted, elements in the second embodiment that are analogous to the first embodiment have a common base reference numeral (e.g., "44" and "144").

The general operation of the second embodiment is principally the same as the first embodiment. When the water lift 110 is rotating, water from the reservoir 136 is drawn into the first tray 138 of the water lift through a water tee 143. The water tees 143 according to the second embodiment are extended to deposit water into the tray 138 from above the water level through a vertical section added to the tee. Water inside the tee 143 is propelled radially outward by centrifugal force caused by the rotation of the water lift system 110. As the water reaches the end of the radial portion 151 of the tee 143, the tee curves into a vertical section 152 of pipe and exits the pipe through a u-shaped nozzle 153 back into the tray 138. The system is designed to maintain the water level 144 below the nozzle 153 to reduce the amount of back pressure on the system. The u-shaped nozzle is appropriately shaped to allow water to flow back through the nozzle during filling of the system prior to start.

Baffles 155 can be provided to control the rotational movement of the water in the tray to smooth out the flow of water in the system. In order to fill the tray with water on each side of the baffles 155, the number of arms on the tee 143 can be increased to provide one exit in each chamber of the tray created by the baffle. Four chambers are shown created by the two baffles, and thus four nozzles 153 have been provided on four arms of the water tee 143. Operation of the water system is otherwise identical to the first embodiment.

The trays are open to the atmosphere and are supported on the down pipes 134 eliminating the need for a separate housing to retain the trays.

Figure 8:
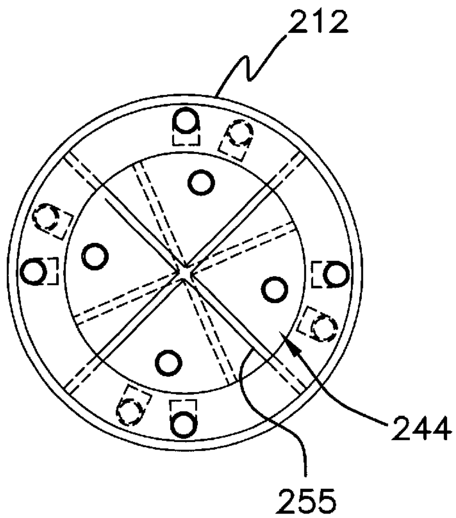
FIG. 8 is a cross-sectional view taken along line 8—8 of FIG. 6 of the lower tray of the water lift generator system according to a third embodiment of the present invention.
Figure 7:
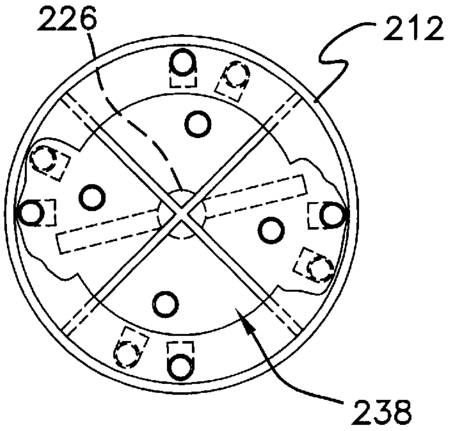
FIG. 7 is a cross-sectional view taken along line 7—7 of FIG. 6 of the upper trays of the water lift generator system according to a third embodiment of the present invention.
Figure 6:
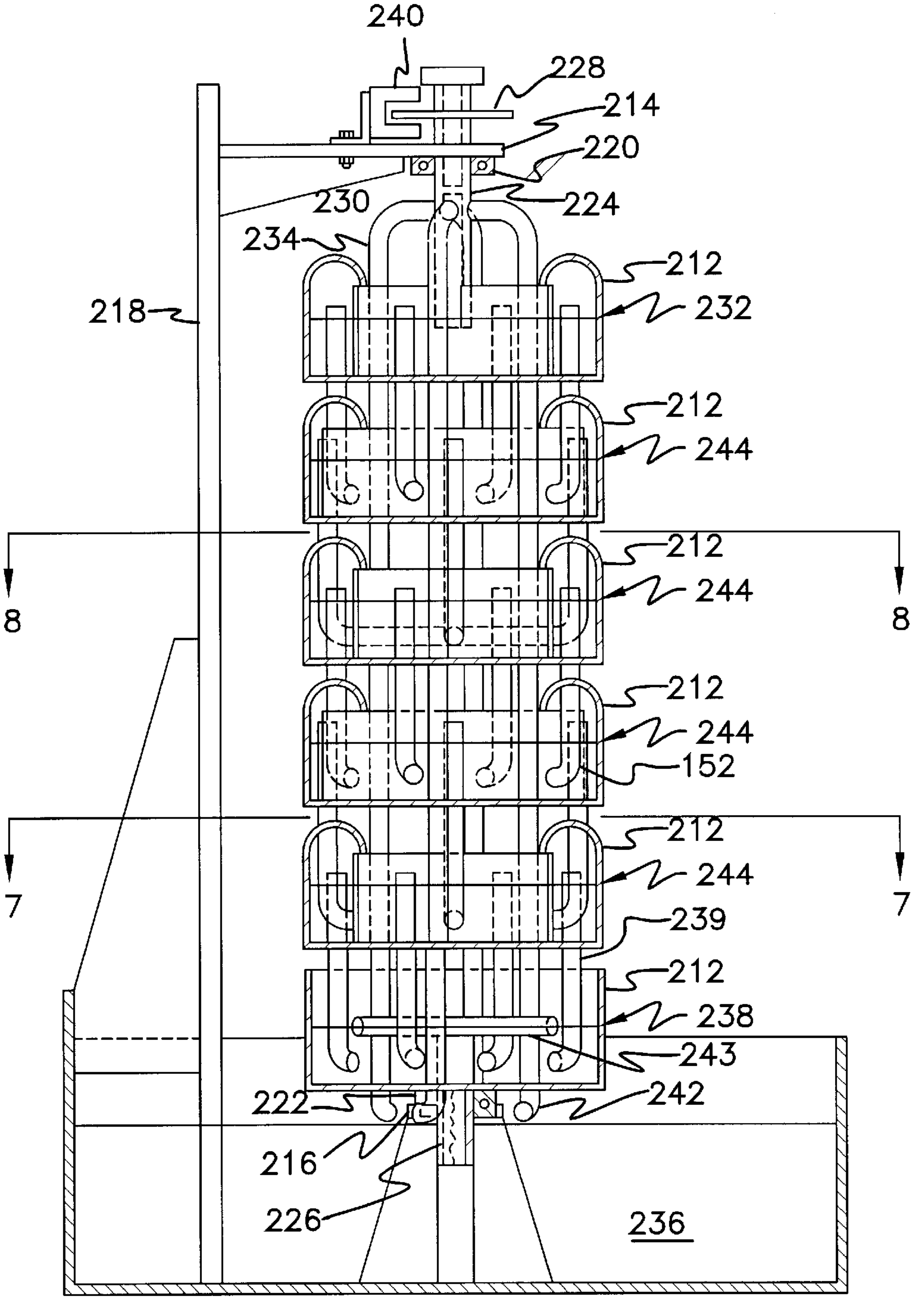
FIG. 6 is a side elevational, breakaway view of the water lift generator system according t a third embodiment of the present invention.

FIGS. 6–8 show a third embodiment of the invention. Unless otherwise noted, elements in the third embodiment that are analogous to the first embodiment have a common base reference numeral (e.g., "44" and "244").

In the third embodiment, a simpler "snorkel" system has replaced the water tees of the first and second embodiment. The lowermost water tray 238 has a tee inlet pipe 226 similar to the first embodiment of the invention to draw water into the lower tray by suction created by the centrifugal force of water forced radially outward inside the tee 143.

Each upper tray 244 has been modified to simplify the flow path of the water through the system. Each tray has a number of baffles 255 to smooth out the flow of water in the trays (eliminate "sloshing"). Centered in each chamber created by the baffles is a snorkel 239. With two baffles shown, four total snorkels per tray would thus be required. Preferably, there are three baffles and six total snorkels per tray. Each tray 238, 244 has been modified to include a splash shield 212 to contain the water in the tray as it exits the snorkel 239 at high velocity and redirect the water back into the tray 238, 244.

As the water system 210 rotates, centrifugal force acting on the water cause the water to migrate outward. As the system reaches a certain velocity the outward pressure of water will force water into the lower opening of the snorkel 239 causing water to rise upwardly through the snorkel to the next level. If necessary to enhance the centrifugal lifting force can be augmented by slanting the snorkels in an appropriate outward direction. The use of snorkels in place of the water tees will simplify the flow path of the water. The manifold at the top of the water lift has been eliminated and water flows directly from the top tray 232 into the down tubes 234.

The fill valves of the third embodiment have been relocated to the bottom of the down pipes 234 to provide easier access to the valves. In operation, the valves are closed and water is added to the top most tray 232. Water flows down the down tube 234 until the tube is full. The water then fills the top tray until the water level exceeds the top of the snorkels 239. Water then flows down the snorkel to fill the next lower tray 244 until that tray is filled to the top of its snorkel levels. This continues until the entire system is filled with water. As shown in the drawings, it is necessary to offset one tray from another so that snorkels from adjacent levels do not interfere with each other. Preferably the offset is 22.5 degrees to provide maximum balance to the system.

The valves are then opened allowing the force of the water exiting the down tubes nozzles to initiate rotation creating a centrifugal force necessary to operate the water lift system. Operation then continues as describe in the first embodiment.

Figure 9:
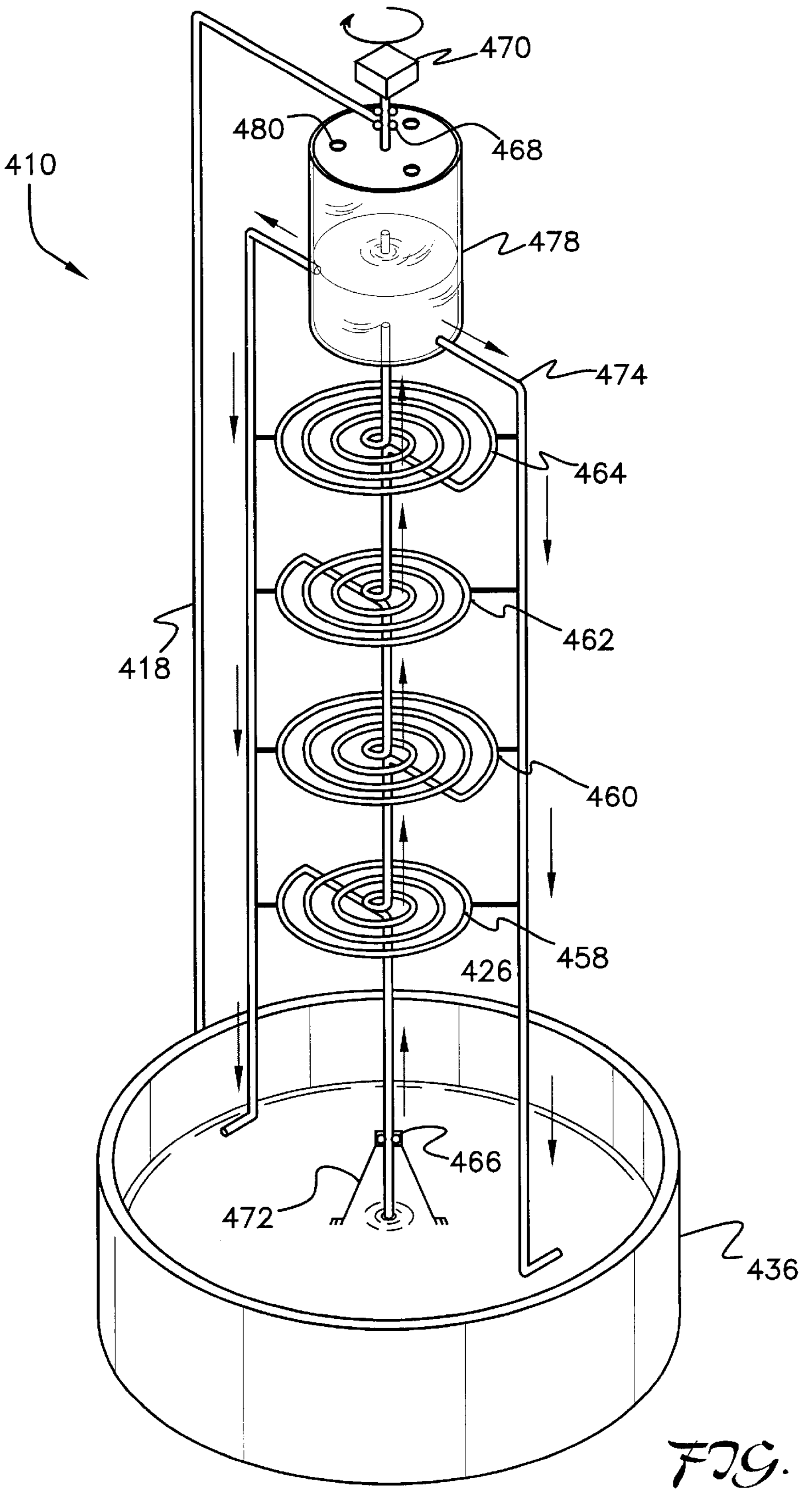
FIG. 9 is environmental perspective view of a water lift generator system according to a fourth embodiment of the present invention.

FIG. 9 shows a fourth embodiment of the invention. The water lift system 410 according to a fourth embodiment has spiral trays 458, 460, 462, 464. Each spiral is designed to spiral in the same relative direction. If the motion of the system is in a clockwise direction, then the trays are spiraled inwardly in a counterclockwise direction. In operation as the water lift spins clockwise, the tube of the spiral spins clockwise as the water inside is forced inwardly around the spiral. Rotational forces acting on the water in a particular spiral tray will be overcome the centrifugal force to force the water inwardly along the spiral as the system turns.

The trays are held in place by down pipes 474 and are preferably formed of one continuous water pipe starting at the entrance pipe 426 and continuing through the four spiral trays 458, 460, 462, 464 to an upper cylinder 476. Upper cylinder 476 may have apertures 480 in the upper surface to equalize pressure in the container. The lower pipe 474 is preferably rotatably supported by bearing 466 and support bracket 472. The upper end of the cylinder 476 may have an axial extension rotatably supported by a second bearing 468 and connected to an electrical output 470 for generating electricity from the rotation of the system. A support frame 418 may also be implemented to maintain the position of the system 410.

In operation, the system is filled with water by an appropriate access port (not shown) provided above the top spiral such as on the cylinder 476. Cooperating valves (not shown) can be provided on the down tubes 474 or inlet pipe 426 to maintain water in the system during the filling stage as discussed in the earlier embodiments. The system is then released to rotate under force of water exiting the down tubes 474. Rotation of the system 410 causes water in the spirals to move inwardly through the spiral. Water at the center of the spiral will be forced upwardly to the next spiral and outwardly under centrifugal force to the beginning of the inward spiral. After exiting the topmost spiral 464, the water will continue upward through the cylinder 476 where it is collected prior to entering the down tubes to provide motive force to continue the rotation of the system.

It is to be understood that the present invention is not limited to the sole embodiment described above, but encompasses any and all embodiments within the scope of the following claims.

I claim:

1. A water circulation system comprising:

a) a central housing rotatably mounted between two supports, said housing having at least one internal wall to separate said housing into a plurality of chambers;

b) a first water tee mounted within said housing to draw water in one of said plurality chambers to a second one of said plurality of chambers;

c) a second water tee mounted to a top portion of said housing to draw water out of said housing into a down tube mounted to said housing;

whereby water flowing through said down tube provides motivating force to rotate said housing.

2. The water circulation system of claim 1, further comprising d) a third water tee mounted to a bottom portion of said housing to draw water into one of said plurality of chambers in said housing.

3. The water circulation system of claim 2, wherein the water flowing out of said housing through said down tube is drawn into said third water tee forming a recirculation system.

4. The water circulation system of claim 3, further comprising an electric generator connected to said housing for converting the rotational velocity of said housing into electrical energy.

5. A water recirculation system comprising a) a cylindrical housing rotationally mounted by at least one support;

b) a plurality of walls within said cylindrical housing separating and defining a plurality of co-axial cylindrical chambers within said housing, including a topmost chamber, a bottom most chamber, and at least one intermediate chamber;

c) a water tee mounted in each separating wall within said cylindrical housing for providing communication therebetween;

d) a water tee mounted to a bottom portion of said cylindrical housing for providing communication between said lowermost chamber and a water supply beneath said cylindrical housing;

e) a plurality of down tubes mounted about said cylindrical housing, each down tube having a spout substantially tangential to said cylindrical housing;

f) a water tee mounted to an upper portion of said cylindrical housing for communicating said upper chamber with said down tube.

6. The water recirculation system of claim 5, further comprising an electric generator connected to said housing for converting the rotational velocity of said housing into electrical energy.

7. The water recirculation system of claim 5, wherein the water exiting the down tube deposits water into the water supply beneath the cylindrical housing to form a recirculation cycle.

* * * * *